(12) United States Patent
Tripier-Larivaud

(10) Patent No.: US 8,424,802 B2
(45) Date of Patent: Apr. 23, 2013

(54) LANDING AREA FOR AIR MACHINES OR VEHICLES COMPRISING EXTENDABLE RECEPTION MEANS

(76) Inventor: Xavier Tripier-Larivaud, Levallois Perret (FR)

( * ) Notice: Subject to any disclaimer, the term of this patent is extended or adjusted under 35 U.S.C. 154(b) by 667 days.

(21) Appl. No.: 12/525,127

(22) PCT Filed: Dec. 17, 2007

(86) PCT No.: PCT/FR2007/002094
§ 371 (c)(1),
(2), (4) Date: Mar. 29, 2010

(87) PCT Pub. No.: WO2008/096052
PCT Pub. Date: Aug. 14, 2008

(65) Prior Publication Data
US 2010/0200694 A1  Aug. 12, 2010

(30) Foreign Application Priority Data
Feb. 5, 2007 (FR) ...................... 07 00802

(51) Int. Cl.
*E01F 3/00* (2006.01)
(52) U.S. Cl.
USPC .................. 244/114 R; 244/115; 244/116
(58) Field of Classification Search .............. 244/114 R, 244/115, 116; 114/261
See application file for complete search history.

(56) References Cited

U.S. PATENT DOCUMENTS

| | | | | |
|---|---|---|---|---|
| 1,770,675 A | * | 7/1930 | Short | 244/116 |
| 2,481,343 A | * | 9/1949 | Redstone | 244/114 R |
| 3,202,243 A | * | 8/1965 | Seward | 187/237 |
| 3,291,422 A | * | 12/1966 | Valkenburg | 244/114 R |
| 3,489,380 A | * | 1/1970 | Vanderlip | 244/114 R |
| 3,649,724 A | * | 3/1972 | Rembert et al. | 64/459 |
| 3,785,316 A | * | 1/1974 | Leming et al. | 114/261 |
| 3,817,479 A | * | 6/1974 | Crowley | 244/17.11 |
| 4,116,408 A | * | 9/1978 | Soloy | 244/114 R |
| 4,174,081 A | * | 11/1979 | Sardanowsky | 244/17.17 |
| 4,665,857 A | * | 5/1987 | Akerman et al. | 114/261 |
| 4,834,321 A | * | 5/1989 | Granger | 244/110 E |
| 4,883,241 A | * | 11/1989 | Snead | 244/114 R |
| 5,067,669 A | * | 11/1991 | Van Horn et al. | 244/114 R |
| 5,119,935 A | * | 6/1992 | Stump et al. | 206/335 |

(Continued)

FOREIGN PATENT DOCUMENTS

| | | |
|---|---|---|
| EP | 0 030 849 A1 | 6/1981 |
| EP | 0 497 646 A1 | 8/1992 |

(Continued)

*Primary Examiner* — Tien Dinh
*Assistant Examiner* — Justin Benedik
(74) *Attorney, Agent, or Firm* — Davis & Bujold, PLLC

(57) ABSTRACT

A landing area (1) adapted to be folded, stored and/or stowed on or in the holder (2) on which it is mounted. It is multi functional, removable, modular and can be adapted to the surface (22) of the holder on which it is supported, connected and/or from which the landing area (1) hangs. Mechanical elements (26) are provided for extracting the landing area (1) from its protection components (20) and for placing the landing area in a position where the landing area is adapted for landing of an air machine or vehicle once the reception elements (10, 11), defining the landing surface (12), are extended. The above-mentioned mechanical elements, or other members (25), are used for extending the reception elements (10, 11). The latter can also be folded, stored and/or stowed using the retraction components (24).

20 Claims, 11 Drawing Sheets

U.S. PATENT DOCUMENTS

| | | | |
|---|---|---|---|
| 5,367,973 A | 11/1994 | Heggertveit | |
| 5,577,687 A * | 11/1996 | Downing | 244/110 E |
| 5,906,171 A | 5/1999 | Kristensen et al. | |
| 6,079,668 A * | 6/2000 | Brown | 244/114 R |
| 7,152,547 B1 * | 12/2006 | Hovland | 114/261 |
| 8,141,511 B1 * | 3/2012 | Dunn | 114/258 |
| 2005/0230537 A1 * | 10/2005 | Chouery | 244/116 |
| 2008/0268404 A1 * | 10/2008 | Burt | 434/55 |
| 2009/0057486 A1 * | 3/2009 | Becht et al. | 244/114 R |
| 2009/0133613 A1 * | 5/2009 | Dunn | 114/261 |

FOREIGN PATENT DOCUMENTS

| | | |
|---|---|---|
| EP | 0 648 898 A1 | 4/1995 |
| FR | 2 636 915 A1 | 3/1990 |
| FR | 2 667 886 A1 | 4/1992 |
| FR | 2 792 955 A1 | 11/2000 |
| NL | 1032458 C2 | 3/2008 |
| WO | 92/12894 A1 | 8/1992 |
| WO | 96/23691 A1 | 8/1996 |
| WO | 99/50138 A1 | 10/1999 |

* cited by examiner

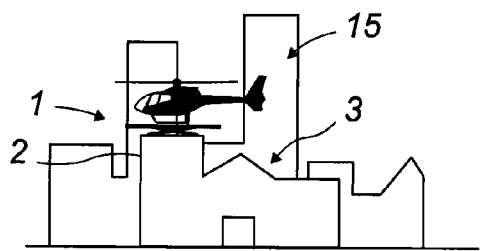
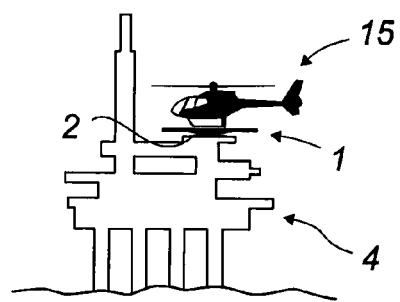
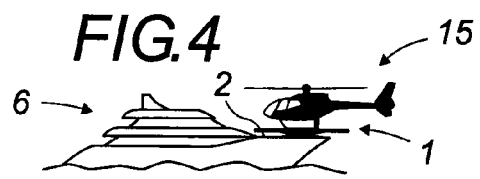
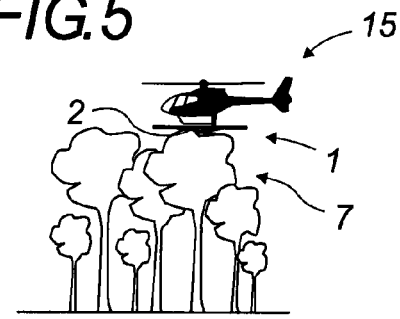
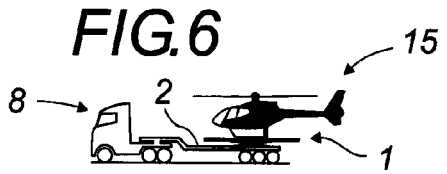
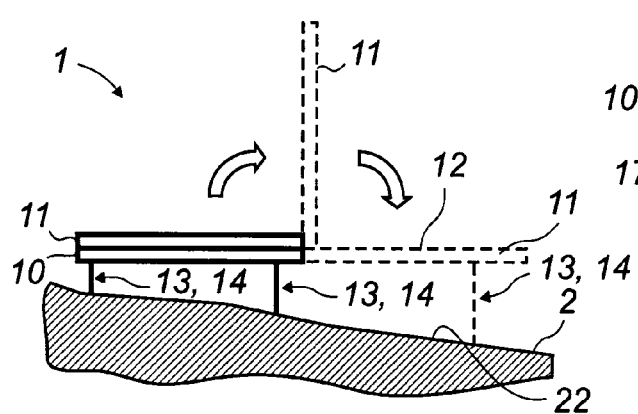
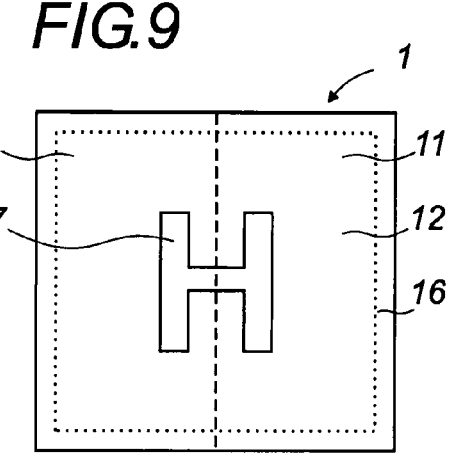

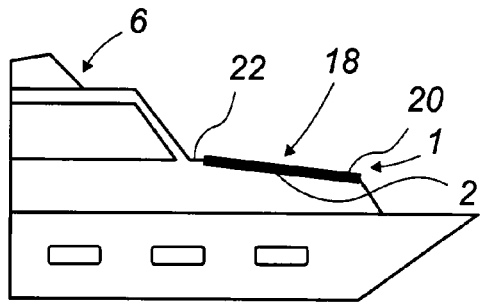
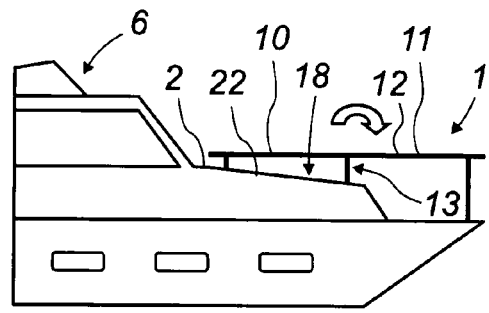
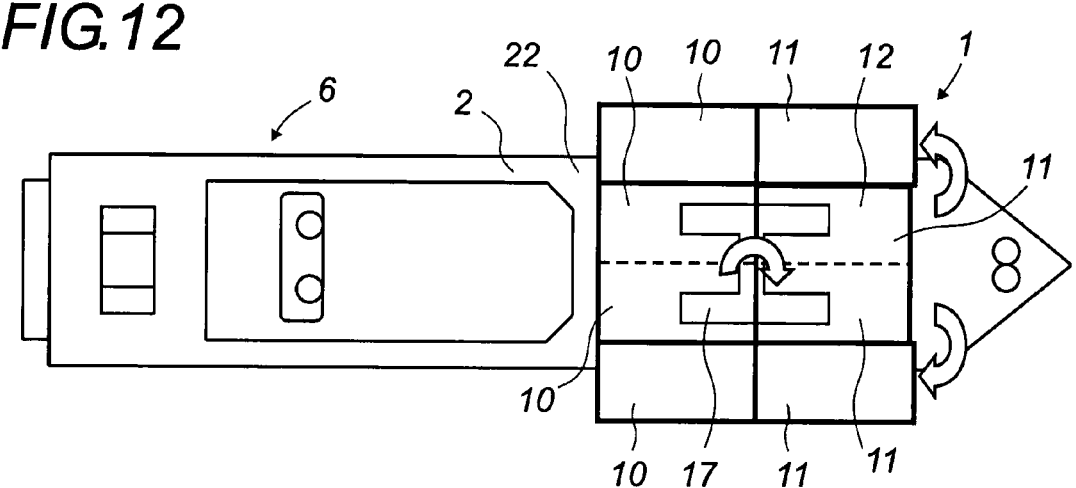
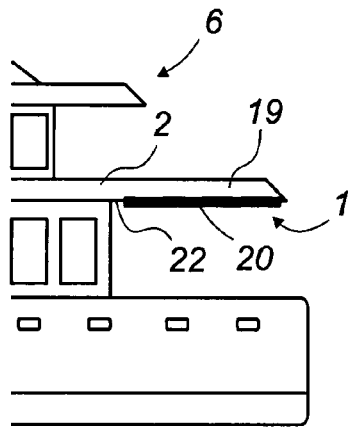
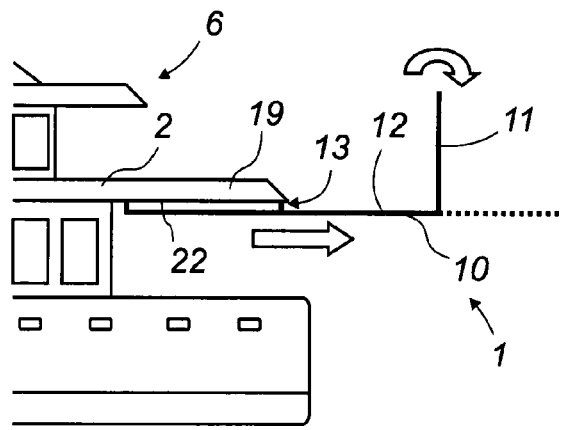

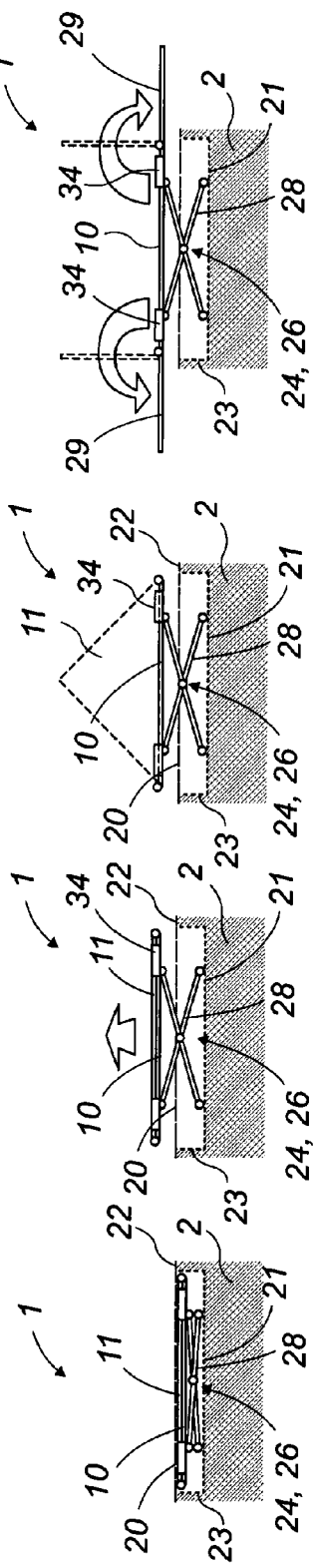

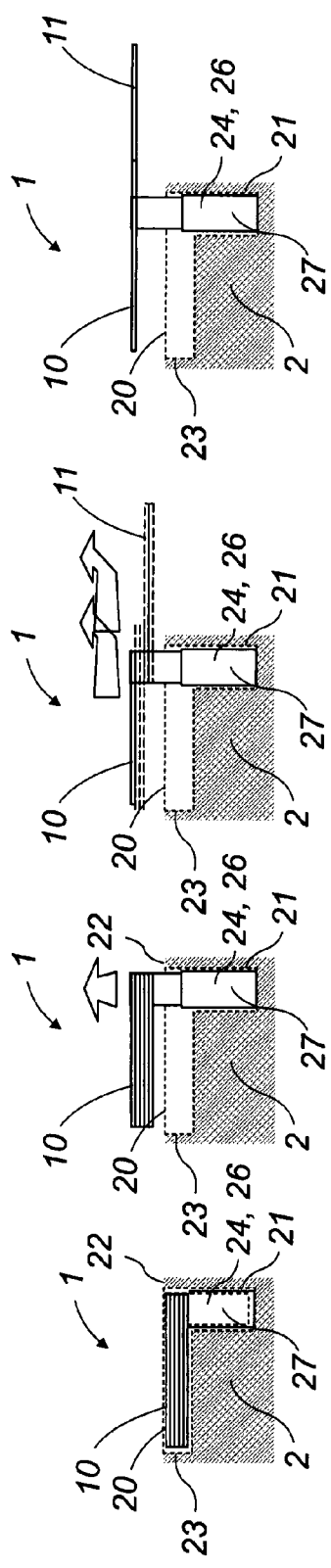
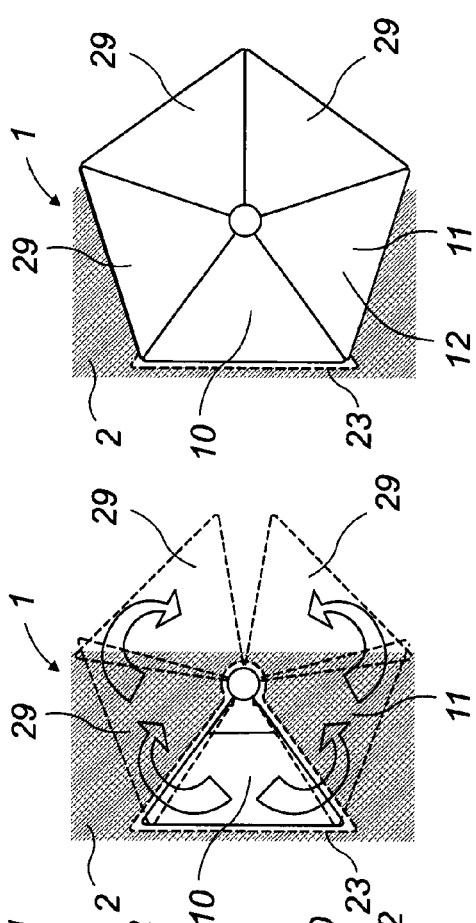

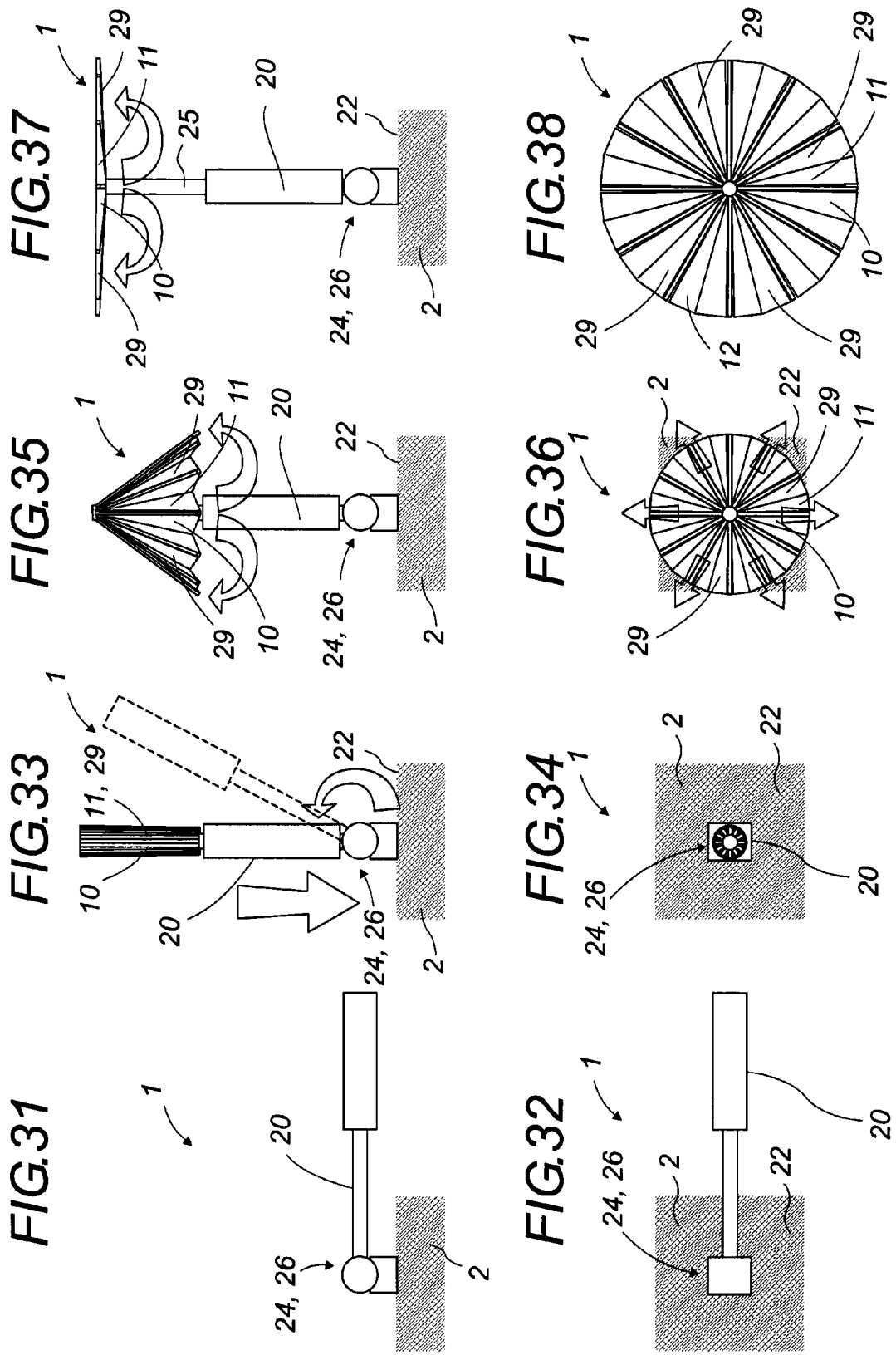

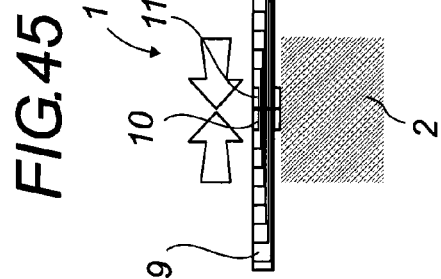
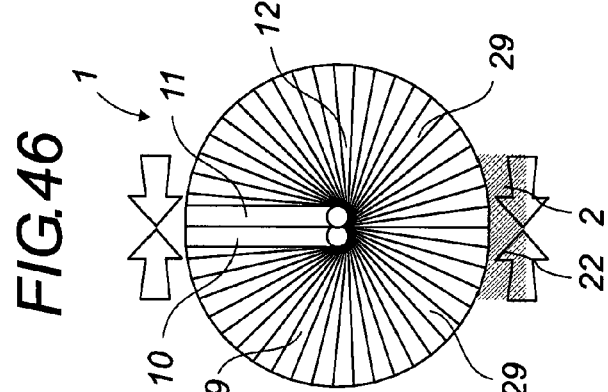
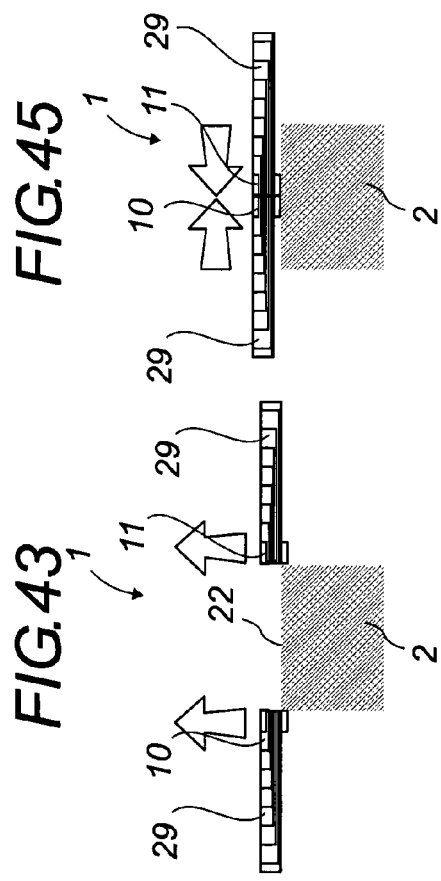
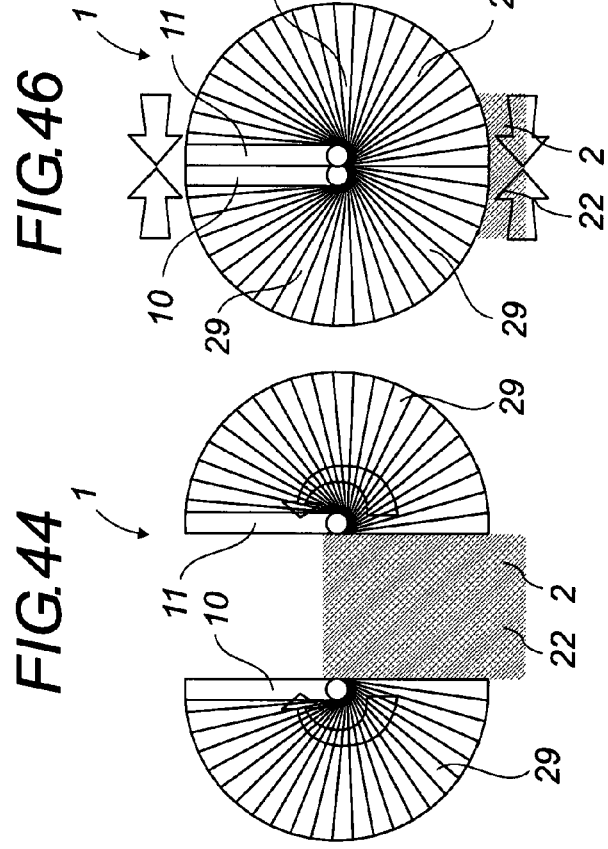
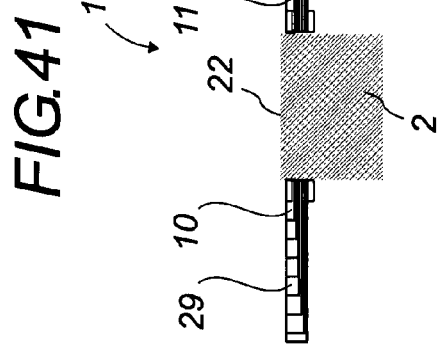
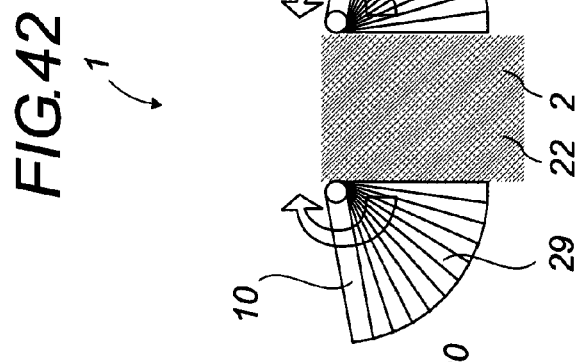
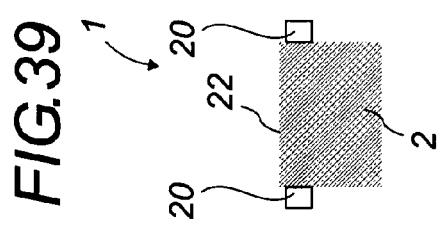
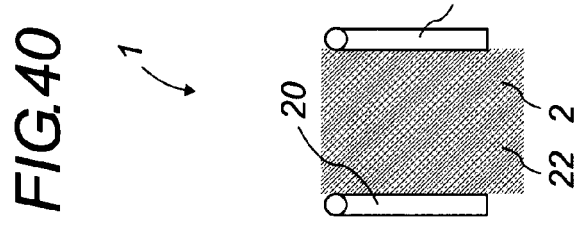

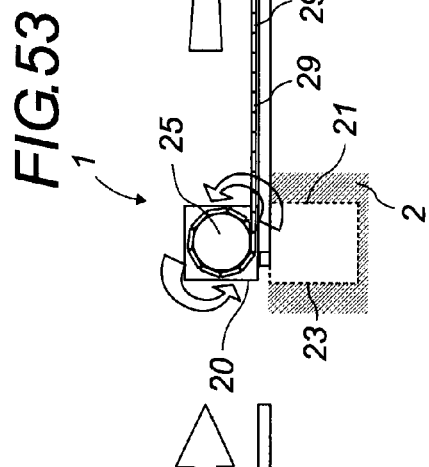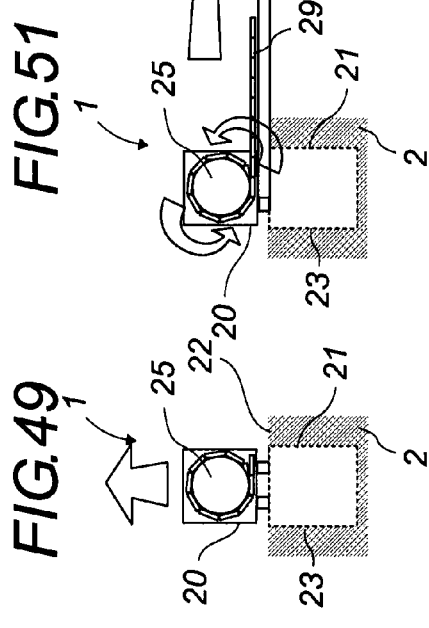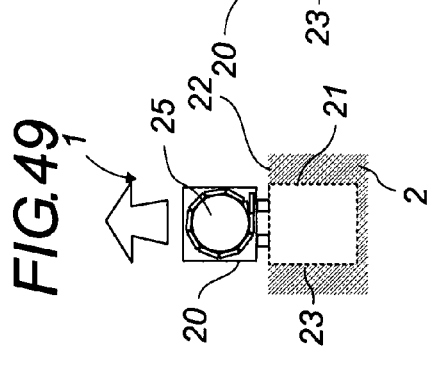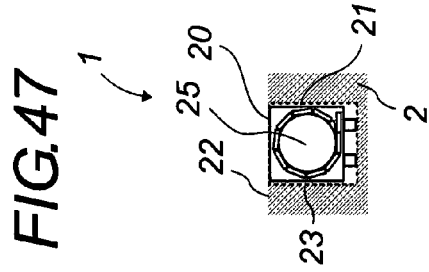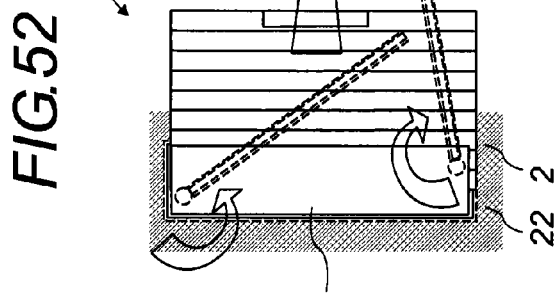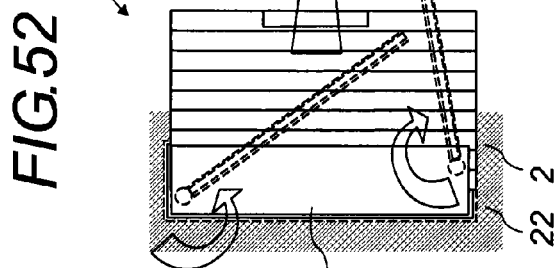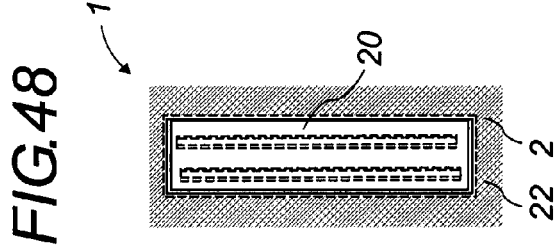

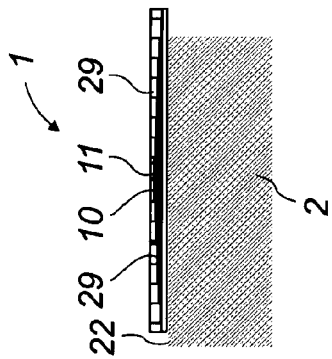
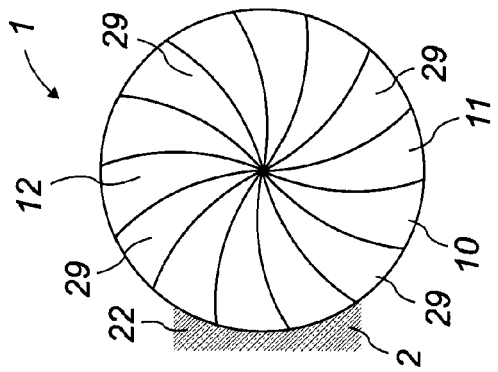
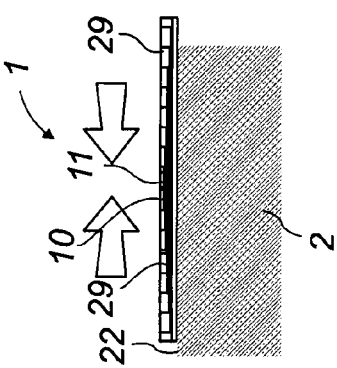
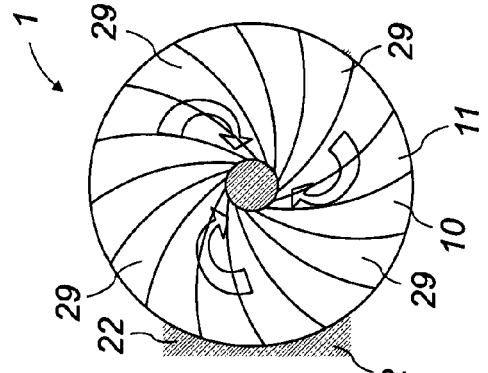
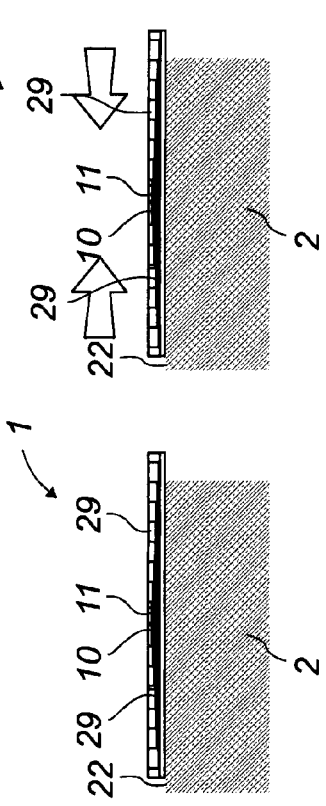
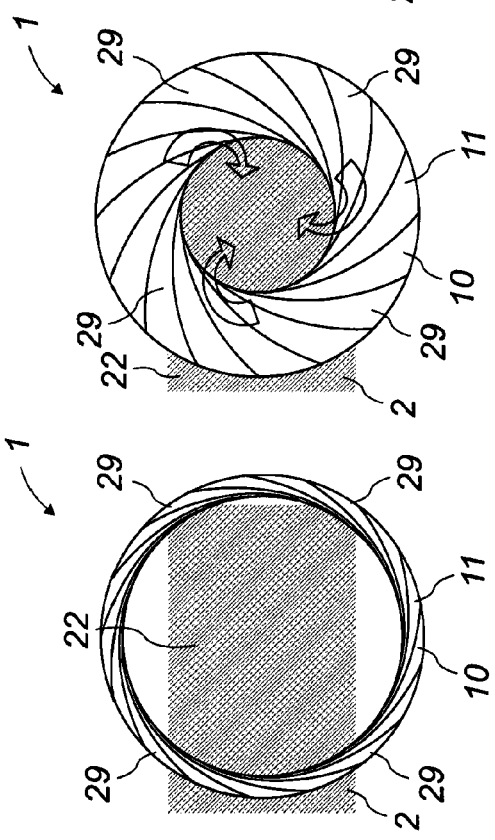

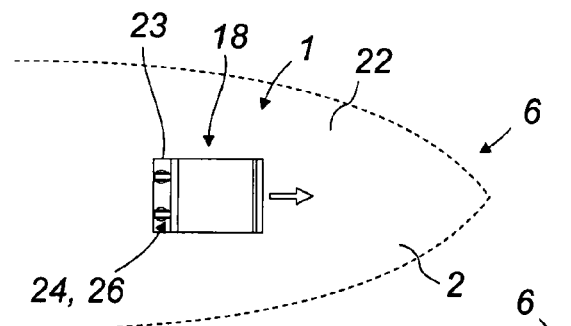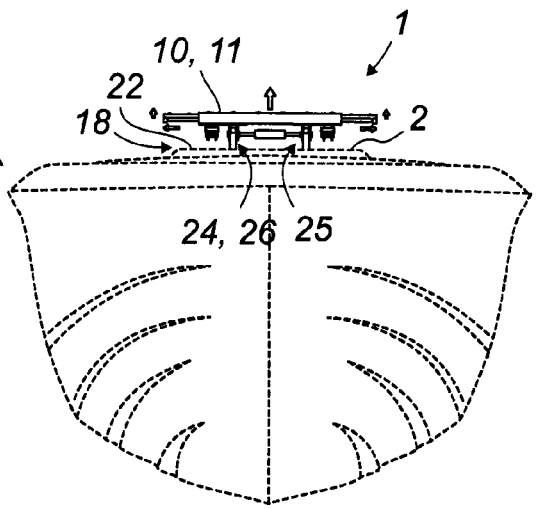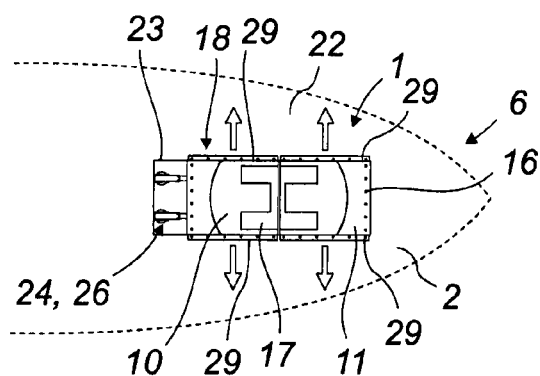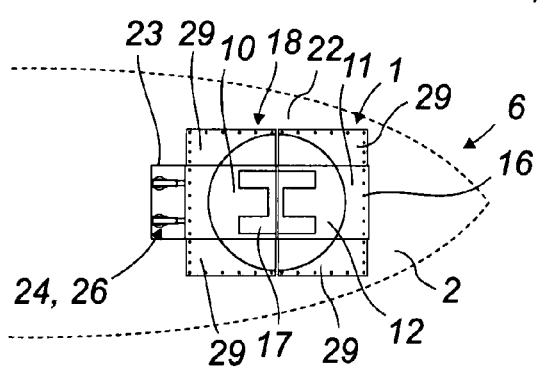

LANDING AREA FOR AIR MACHINES OR VEHICLES COMPRISING EXTENDABLE RECEPTION MEANS

This application is a national stage completion of PCT/FR2007/002094 filed Dec. 17, 2007 which claims priority from French Application Serial No. 07 00802 filed Feb. 5, 2007.

FIELD OF THE INVENTION

This invention relates to a landing area for air devices or vehicles, more particularly for vertical landing or takeoff aerostats and aerodynes, or short takeoff/landing devices.

The landing area can be retracted on the support surface where it is assembled, or into a protective device located either on or inside the support. All the reception elements that form the landing area of the invention can be completely retracted inside the protective means. More specifically, this landing area is multi-functional, removable, modular, and adaptable to the supporting surfaces where it is positioned, or to or from which it is connected or suspended.

BACKGROUND OF THE INVENTION

At the present time most landing areas for aerostats and aerodynes that take off vertically or land in small areas, for example helicopters and autogiros, have certain features in common: they require space, that is, a minimum amount of surface; they are fixed and all of one piece; they rest on a plane solid surface; and they are used only as a landing area and are not adaptable for other purposes.

Given these restrictions, the landing areas can only be constructed in suitable locations, limiting both the number of landing areas and of users.

Various solutions have been proposed over time, but generally they are responsive to only one specific need. For example, various landing areas exist for landing on special terrain. Thus, PCT Application No. WO 96/23691 divulges a landing area for landing on water, and Patent No. FR 22 687 886 divulges a landing area for loose soil. Similarly, there have been solutions proposed regarding the design of landing areas. For instance, Patent No. FR 2 792 955 and Patent No. EP 0 648 898 divulge temporary dismountable landing areas, while Patent No. FR 2 636 915 divulges a transportable landing area, PCT Application No. WO 92/12894 divulges an extendible landing area and Patent Nos. EP 0 030 849 and No. EP 0 497 646 divulge a method for positioning and sheltering an aerodyne in a closed container. The solutions divulged in these documents generally respond only to one aspect of the problem, while permitting the landing area to be used for only one purpose.

European Patent Application No. EP 0030849 of ISRAEL AIRCRAFT divulges a landing structure and hangar for an air vehicle, for example, a helicopter. This structure, which may be placed on the deck of a ship, has an enclosure with a frame, lateral walls, and a plurality of panels supported on the tops of the lateral walls which slide horizontally into a retracted interior position to close the enclosure or into an external deployed position to open the enclosure and extend laterally beyond the lateral walls. There is an elevator platform that moves vertically between a lower position inside the enclosure and an upper position that is horizontally aligned with the plane of the panels. When the elevator platform is in the upper position, it constitutes, together with certain panels which are in the extreme deployed position, an expanded landing area for a helicopter landing or takeoff; and when the elevator platform is in the interior retracted position it serves to shelter the landed helicopter inside the enclosure, with the panels sliding into their interior position to close the enclosure and forming a smaller landing area for another helicopter, if necessary. Nevertheless, this structure is especially cumbersome, not removable, and it is in no way designed to be completely housed in a protective device.

U.S. Pat. No. 7,152,547 of HOVLAND VIDAR describes a motion compensation system for a helicopter platform on a ship. A controller communicates with an angle detector and regulates at least one actuator, maintaining the angle of the platform essentially constant for the helicopter in order to compensate for the motion of the ship.

U.S. Pat. No. 4,883,241 of SNEAD EDWIN divulges a helicopter platform for use on trains. This platform comprises a flat surface with an area adapted to receive the landing skids or runners of a helicopter and a plurality of structural elements connected to the flat surface and to the chassis of a railway car. An extendible portion of this flat surface can be selectively activated to increase the total area of the flat surface. However, this structure is very cumbersome, not removable, and is in no way designed be completely housed in a protective device.

SUMMARY OF THE INVENTION

The invention proposes to overcome these disadvantages with a plurality of suitable solutions. The landing area of the invention can actually adapt to the characteristics of the area where it will be installed and to the different functions the user desires. As such, the landing area of the invention may be installed on any surface, it can assume the size and shape desired, it is removable, modular and adaptable, and finally, since it is multi-functional and modifiable, it adapts to the user's wishes as well as to the latest technological advances, most recent uses and trends. Finally, all the elements of the landing area according to the invention can be enclosed within a protective shelter.

To achieve this goal, the landing area of the invention comprises at least two reception elements which can be joined to form a larger landing area when they are deployed; at least one protective device inside which all the reception elements of the landing area of the invention can be completely retracted; at least one technical mechanical means for retracting at least one reception element, said retracting means moving at least one of the reception elements to retract it from the support surface where the landing surface is placed and to house it inside the protective means; and at least one technical mechanical means for extracting and/or deploying at least one reception element, said extraction means moving at least one of the reception elements to remove it from the protective device where it was stored while retracted, and to deploy it into position for use.

Finally, the landing area according to the invention may comprise a technical floor, preferably modular and interchangeable in design, for the purpose of modifying its uses. Therefore, this technical floor may form a landing surface, but also any other surface such as, for example, a reception area for guests, a sunbathing structure, a storage area, etc. In addition, merchandise stored on the landing surface of the landing area of the invention when used for storage may preferably be secured using any securing system, for example, housings, chains, straps and/or similar devices which are provided on the area.

For the sake of convenience throughout the remainder of this document, the term "landing surface" will refer to any surface formed by the upper portion of the reception elements, whether it is a landing surface, a reception area for guests, a sunbathing structure, a storage area, or any other surface.

For practical reasons the area according to the invention may comprise a means for pivoting its landing surface similar to a pivoting platform, for example, in order for aircraft to take off facing wind.

A shock absorbing system, for example, antivibratory blocks, is preferably provided for the landing area of the invention in order to steady it during takeoff and landing.

For greater stability, particularly if the area according to the invention is located on an unstable or moving support surface, for example on a ship, the landing area may be equipped with any system compensating for movements of the support surface. Thus, for example, hydraulic cylinders regulated to eliminate pitching and/or rolling may be provided, or shock absorbers, antivibratory systems, or any other similar means to maintain the area essentially horizontal.

According to a preferred embodiment the landing area of the invention and the reception elements can be retracted and then extracted from a possible housing and deployed to form a landing surface. Thus, the landing area can be retracted on the support system where it rests, from which it is suspended and/or to which it is attached, or within a protective means provided on or inside said support, while the reception elements of the landing area of the invention may be retracted, for example, by folding them back like butterfly wings, in accordion, or in some other appropriate way, so they occupy the smallest possible amount of space on the support surface where the landing area is located, or inside a protective means located on or in this support.

There are numerous advantages to a retractable device, whether it is the landing area or a reception element, particularly because it is protected from the outside and the device itself interferes only minimally with the environment. Additionally, a retracted device occupies only a minimum of space, reducing its visual impact, sparing space, limiting windward surface, and making it less disruptive to traffic and maneuvers by users, which may pose a danger. A retracted device is less likely to be bumped and damaged, and it can be placed in a protective means such as an embedded housing, under a hood, or a protective cover to prevent exposure to the outdoors. In addition to natural exterior forces such as temperature extremes, rain, snow, frost, salt air, sand, dust, falling objects, dirt, thunder, lightning, etc., the landing area and/or its reception elements may also be exposed to harmful forces arising from its location such as water, air, pressure, high or low temperatures, waves, high voltage, etc. A device that is stored inside a protective means may also perform additional functions, such as serving as a storage surface or a sunbathing structure, then serving as an area for vertical takeoff or short landing aerodynes and aerostats once it has been deployed. Moreover, a retractable device can also easily be dismantled and/or removed, for example for repairs, to be replaced by another model and/or to add new features.

Furthermore, the fact that the landing area can be stored means it can be installed anywhere, including locations that would not normally be suitable such as small spaces, oddly shaped spaces, spaces made of unlikely materials, and/or spaces with unsuitable structures.

Additionally, storing the reception elements offers the advantage of maximizing the reception surface by increasing the number of reception elements and/or deployment techniques and tools, as well as the ability to associate or disassociate the reception elements according to their use and/or placement. Thus, for example, it is possible to have a more slack or cushioned reception element where an aerodyne or an aerostat lands, connected to a more rigid or fixed reception element joining it to the support surface.

Advantageously, the retracted reception elements do not project beyond the landing area and can also be placed in a protective means, for example, inside an embedded housing, under a hood, or in a sheltering structure, the latter being the same structure that protects the folded up landing area.

The fact that the landing area can be removed and transported offers numerous advantages. It can actually be removed and repositioned elsewhere when no longer needed or when the space it occupies is needed. This also facilitates repairs, cleaning, modifications, or replacement by another newer unit or a landing area with more functions. The fact that the landing area can be removed and transported also allows for winter storage in a location with less exposure to the elements or to theft, as well as permitting it to be used elsewhere.

The landing area may be removed or transported using, for example, an automatic connecting system with plugs and quick connections and/or joints for removing and repositioning the landing area without concern for the various existing connections and joints. This is also possible with a system of plugs that may or may not be visible for removal of the landing area using any mechanical and/or manual system, or using a system of mechanisms to facilitate its retraction and replacement, and/or relying on natural motion, for example, allowing the landing area to be removed under the effect of its own weight.

According to a preferred embodiment, the landing area of the invention and its reception elements are deployed using one or more mechanisms, the ultimate objective being to produce a generally flat, horizontal reception surface located at a suitable height for landing helicopters, aerostats, or other desired uses.

Deploying the landing area of the invention preferably can be accomplished either vertically or horizontally over a range of 360 degrees.

There are no limitations as to the angle, the amplitude, or the dimension of this deployment. Similarly, there are no limits to the specific technical means used, as each means for deploying the landing area can be independent, multifunctional and/or combined with other deployment means if necessary. At each step of deployment, whether there are single or multiple steps, the invention preferably uses a deployment control system to slow down the deployment and/or maintain the landing area in position. In the same way, the invention preferably uses a blocking and/or safety system. In a preferred embodiment of the invention, all these systems are advantageously controlled by whatever means are necessary, for example, using a command center, telecommand, etc.

Before, during or after the landing area is deployed, the reception elements may be deployed in turn in order to be connected and form a larger landing surface. For a small landing area, the landing surface may be composed of only two reception elements. For larger surfaces, there may be a larger number of elements. Therefore, two successive reception elements constituting the surface may be joined using any system to connect them either completely or partially and to produce an essentially flat surface. The landing surface may then be deployed in various forms by using any appropriate manual and/or mechanical system. Therefore there may be a technical mechanical deployment means for moving at least one reception element to deploy it in the form of a diaphragm, corolla, fan, umbrella, platform, shutter, rolling shutters, or to open it into two, three, or four or more flap segments, said segments being either identical and/or different in size.

In the case of a landing surface composed of telescopic, articulated, embedded, or folded or elements and the like, it is assumed here that these elements constitute so many unitary reception elements.

Deployment of the landing surface may advantageously proceed using the same steps as deployment of the landing area using any similar system.

To proceed with all these various deployments, it is possible to use any manual and/or mechanical system, either independently and/or in combination, to actuate one or more deployment devices.

BRIEF DESCRIPTION OF THE DRAWINGS

Other characteristics and features of the invention will become apparent from reading the following detailed description, taken with reference to the attached drawings, in which:

FIGS. 1 through 7 are profiles representing examples of the placement of and use of a landing area according to the invention;

FIG. 8 is a schematic cross-section profile showing the operational principle of one example of a landing area according to the invention;

FIG. 9 is an overhead view showing an example of a landing area according to the invention;

FIG. 10 is a profile view showing one example of a landing area according to the invention folded beneath and attached to a sunbathing structure located at the front of a large ship;

FIG. 11 is a profile view showing the landing area of FIG. 10 in the deployed position and attached to the sunbathing structure;

FIG. 12 is an overhead view showing one example of a landing area according to the invention attached to a sunbathing structure located at the front of a large ship with the landing surface having been placed in the deployed position;

FIG. 13 is a profile view showing one example of the landing area according to the invention in the folded position, suspended from and fastened below the deck on the upper level of a large ship;

FIG. 14 is a profile view showing the landing area of FIG. 13 in partially deployed position, suspended from and fastened below the deck on the upper level of the ship;

FIGS. 15 through 62 show various modes of deployment for the landing area and the landing surface, with the drawings varied so that the odd-numbered drawings are profile views and the even-numbered drawings are the corresponding overhead views;

FIGS. 63 through 65 are overhead views showing the steps in a preferred method of deployment for a landing area according to the invention and its landing surface;

FIGS. 66 and 67 are front views showing the steps in the preferred method of deployment of FIGS. 63 through 65;

DETAILED DESCRIPTION OF THE DRAWINGS

Figure 68:
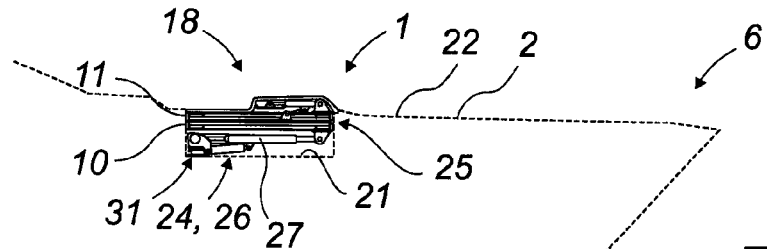
FIGS. 68 through 71 are profile views showing the steps in the preferred method of deployment of FIGS. 63 through 65.

The landing area 1 of the invention is intended for use on numerous types of support 2 and in different environments. In FIGS. 1 through 7, therefore, there are some examples using landing area 1 of the invention, respectively, on a building 3, on an offshore oil drilling platform 4, on a mountainous terrain 5, on a ship 6, in trees 7, on a road vehicle 8, and on a structure floating on water 9. It is still possible, however, to install the landing area on or inside any other type of vehicle, terrain, or natural or artificial structure.

FIG. 8 shows the operational principle of a simplified landing area 1 of the invention. This landing area 1 rests on a supporting surface 2 that is neither flat nor horizontal. It comprises two reception elements 10, 11, for example soild, to be deployed for forming a larger landing surface 12. Landing area 1 also comprises at least one fixation and support armature 13, and preferably several, supporting reception elements 10, 11 once they have been deployed so that landing surface 12 will be essentially horizontal. In a simplified version of landing area 1, these fixation and support armatures 13 are adjustable and preferably are in the form of folding props 14 that may comprise small wheels. Reception elements 10, 11 of landing area 1 of the invention may easily be folded and unfolded with the help of hinges and pins (not shown). As will be shown in detail below, other mechanical means may be provided to aid deployment of reception elements 10, 11. These may consist of an electrical, magnetic, aerolic, pneumatic, hydraulic, hydropneumatic, or any similar system for deploying landing area 1. These systems may be independent, multifunctional, and/or connected to other means of deployment.

In FIG. 9 a simplified landing area 1 according to the invention is shown from above, with the two reception elements 10, 11 having been deployed. Once deployed, this landing area resembles any landing area 1 for aerodynes 15 and aerostats. In this drawing a lighting system 16 is also shown surrounding the landing area for marking out the landing surface 12 for nighttime or reduced visibility landings, as well as a lighted letter "H" 17 to mark the center of the landing area.

This device may be useful, for example on ships 6 that lack enough available surface to install a landing area 1 for aerodynes and aerostats. One example using a simplified version of landing area 1 on a ship 6 is shown in FIGS. 10, 11, 12, 13 and 14.

Landing area 1 of the invention may be mounted, for example, on the front of a ship 6 near a sunbathing structure 18 and folded up inside it, as shown in FIGS. 10 through 12. This area has been deployed and positioned essentially horizontally using fixation and support armatures 13 holding a first reception element 10 and/or any other necessary mechanical system. A second reception element 11 is then unfolded to form a landing surface 12.

If the obtained landing surface 12 is insufficient, the first and second reception elements 10, 11 may take the form of double articulated elements folded over each other and may be unfolded once again to double the size of landing surface 12, as shown in the overhead view in FIG. 12. In this case landing area 1 comprises six reception elements 10, 11 which are folded into four thicknesses when landing area 1 is placed beneath sunbathing structure 18.

In this embodiment it would also be possible for only one of the two reception elements 10, 11 to be a doubled, folded, and articulated element, with landing area 1 then comprising four reception elements.

Landing area 1 is particularly well suited for attachment to the front of a ship 6 below a sunbathing structure 18, but depending upon available space, it might easily be located at the rear of a ship 6, either below another sunbathing structure or an existing structure, as shown in FIGS. 13 and 14.

Landing area 1 may also be adapted to the existing structure of a building 3 on land. It may be suspended or attached to it, as shown in FIGS. 13 and 14 with regard to ship 6, either to a wall, a floor, the roof of a house, or any to support capable of receiving such a device 1 as shown in FIGS. 1 through 7.

In FIGS. 13 and 14, which show another embodiment, landing area 1 is suspended from and attached to the deck 19 of the upper level of a ship 6. In FIG. 13 the reception elements 10, 11 are retracted. In FIG. 14 landing area 1 is shown in the course of deployment. The first action consists of sliding the two reception elements 10, 11 toward the rear of the structure. Once extracted, landing area 1 may then be redeployed toward the rear. It is still possible to increase the surface of landing area 1 by incorporating other reception elements in the deployment process.

In a preferred embodiment of the invention, reception elements 10, 11 of landing area 1 are made of metal or a composite material, although they may be made of any suitable material. Likewise, fixation and support armatures 13 are preferably made of metal or composite material, although they may be made of any suitable material.

Several examples of preferred embodiments for deployment of a landing area 1 of the invention are shown in FIGS. 15 through 62, with variations in the drawing such that the odd-numbered drawings are profile views representing the successive steps of deployment in an embodiment and the even-numbered drawings show the corresponding overhead views. The deployment means for landing area 1 and its landing surface 12 advantageously allows a large size landing surface 12 to be obtained from one landing area 1 that was initially retracted inside a protective means 20.

Among the different examples of embodiments, those that have been shown are as follows:

Deployment of a landing area 1 with folding and unfolding reception elements 10, 11 (FIGS. 15 through 22);

Deployment of a landing area 1 with stackable, turning reception elements 10, 11 (FIGS. 23 through 30);

Deployment of a landing area 1 with folding reception elements 10, 11 in a tube FIGS. 31 through 38);

Deployment of a landing area 1 with turning, retractable reception elements 10, 11 (FIGS. 39 through 48);

Deployment of a landing area 1 with an unrolling and unfolding reception element 10 (FIGS. 47 through 54); and Deployment of a landing area 1 with closable and concentric reception elements 10, 11 (FIGS. 55 through 62).

These examples, while numerous, are not intended to be limitative. A person skilled in the art could envision others without departing from the general principle of the invention. It should be noted, however, that in each case, the unit of reception elements 10, 11 of the landing area according to the invention can be completely retracted inside a protective means 20.

Therefore, most of the preceding examples shown relate to deployment from an embedded horizontal housing 21, whereas it is possible to envision other ways of attaching and housing landing area 1.

Likewise, the positioning and ultimate orientation of landing surface 12 relative to support surface 22 which landing area 1 is attached to may be freely accomplished using rotating and/or translational elements.

In these examples and embodiments, landing area 1 generally comprises a frame 23 which may or may not be affixed to support surface 22 to which landing area 1 is attached. This frame 23 is preferably housed in a housing 21 embedded in support 2 to which landing area 1 is attached.

Frame 23 preferably comprises the technical mechanical retraction means 24 for landing area 1 and the deployment means for landing area 1, for example, allowing the landing area and/or the reception elements 10, 11 to be retracted inside of and then extracted from protective means 20.

More generally, landing area 1 comprises at least one technical mechanical retraction means 24 to move at least one of the reception elements 10, 11 on the landing area 1 or both of them, retracting it from surface 22 on support 2 to which the landing area 1 is attached or inside protective means 20 where it can be housed. Retraction of an element means that the technical mechanical retraction means 24 may be used to conceal, fold up, or stow the element, whether it is the entire landing area 1 or reception element 10, 11.

Similarly, landing area 1 comprises at least one technical mechanical extraction means 26 and/or one technical mechanical deployment means 25 for at least one reception element 10, 11, for the landing area 1, or for both of them.

A technical mechanical extraction means 26 for extracting an element moves the element and removes it from protective means 20 where it remained while retracted.

A technical mechanical deployment means 25 for deploying an element, however, moves the element and folds, relocates, tips, unrolls, removes, disengages, or separates it from the other element.

For example extraction means 26 for extracting a reception element removes it from its protective means 20, while deployment means 25 associated with it unfolds, relocates, tilts, unrolls, removes, disengages and/or separates it from another element in order to obtain the desired landing surface 12.

A landing area 1 considered in its totality may, itself, be removed from its protective means 20 and deployed in order to be in position for landing air machines or vehicles 15 when reception elements 10, 11 are deployed.

Advantageously, extraction and deployment can be accomplished using the same technical mechanical means 25, 26. In the same way, the preceding mechanical means, either extraction means 26 and/or deployment means 25 or retraction means 24, are preferably but not necessarily the same ones.

These different mechanical means 24, 25, 26 may be either electrical, magnetic, aerolic, pneumatic, hydraulic, hydropneumatic, and so forth; they may be motorized, manual, that is, activated by hand, or they may even be activated using several of these means in combination.

The different means for extraction 26, deployment 25 and/or retraction 24 may comprise, for example, a mechanical arm, a lift mast, a scissored lifting device, a cylinder, a pump, a rack, a chain, a cable, or the like. They may also comprise one or more guide devices such as a glider, rail, overhang, trestle, contact, stand, a suspended or tilting device, or similar element The movements achieved by the technical mechanical retraction means 24 are, for example, centered pivoting, offset pivoting, translation, or any combination of these movements, such as, for example, translation followed by pivoting.

Similarly, landing area 1 according to the invention may be attached so it projects from surface 22 of support 2 or may be enclosed inside it, either horizontally, laterally, or suspended from it, or in any other way that allows all the reception elements 10, 11 of the landing area of the invention to be completely retracted inside protective means 20.

The different examples of technical extraction and/or deployment means 26 and retraction means 24 shown in all the schematics are provided by way of example and are not limitative; a person skilled in the art could easily combine or interchange them without departing from the general principle of the invention.

As shown in FIGS. 23 through 30, extraction means 26, deployment means 25 and/or retraction means 24 may comprise, for example, pneumatic, hydraulic, or another type of cylinder 27, while as shown in FIGS. 15 through 22, for example, they may comprise scissored lifting devices 28 that may or may not be actuated by hydraulic, pneumatic, or some other type of cylinder 27, attached to gliders or a similar system.

The landing area 1 may comprise a shock absorbing system, for example, a system of antivibratory blocks to steady landing area 1 during takeoffs and landings. Reception elements 10, 11 composing landing surface 12 are then preferably attached to this shock absorbing system. Advantageously, this shock absorbing system may comprise dynamic elements such as cylinders, associated with an intelligence system for real time detection of pitch, listing, or rolling in order to constitute a perfected stabilization system for landing surface 12.

An example of a landing area 1 according to a preferred embodiment is shown in FIGS. 63 through 71. It is a positioned, folded, and retracted landing area 1 inside a housing 21 located under a sunbathing structure 18 at the front of a large ship (FIG. 68).

In this preferred embodiment landing surface 12 comprises two reception elements 10, 11, a principal reception element 10 upon which the entire landing surface 12 is folded and positioned, and a secondary reception element 11 which, when in folded position, rests on principal reception element 10 and is deployed toward the front. Landing surface 12 also comprises four identical supplementary reception elements 29, two connected to principal reception element 10 and two connected to secondary reception element 11, said supplementary reception elements 29 being deployed laterally outside principal reception element 10 and secondary reception element 11.

Landing area 1 according to this preferred embodiment comprises a mechanical extraction means 26 and deployment means 25 for landing area 1 using two hydraulic lifting platforms guided horizontally and vertically by hydraulic cylinders 27. This mechanical system of extraction 25 and deployment 26 is deployed toward the front of ship 6 in order to position principal reception element 10. It is supplied with energy through quick connectors 31 and connections located near its base. Mechanical deployment system 25 is not affixed directly to principal reception element 10, but connected to an orientable pivoting platform 32 using four solid anchors 33. This pivoting platform 32 is attached to the reception elements by means of an antivibratory system. Along the length of its deployment the mechanism is regulated using a blocking and control safety system.

Figure 69:
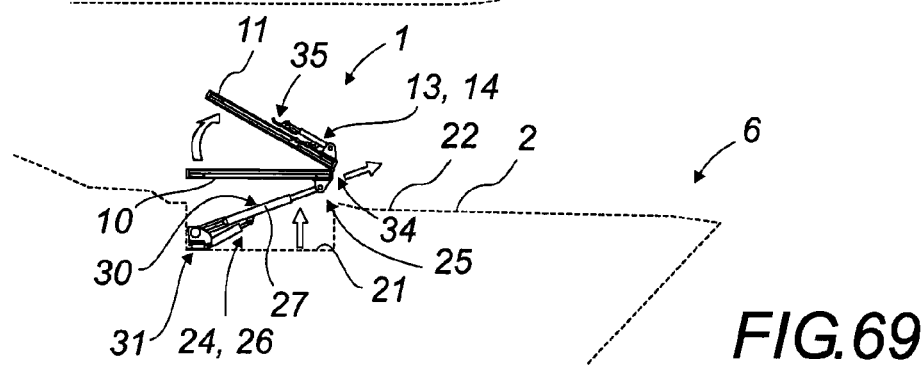

When landing area 1 and its landing surface 12 are extracted and deployed, they are first extracted vertically from protective housing 20 using the mechanical deployment system 25 by extending the two lift masts 30 (FIGS. 66 and 69).

Once principal reception element 10 is in place, the remainder of landing area 1 can be deployed. Secondary reception element 11 is deployed toward the front using a mechanical deployment system 25 placed on the two reception elements 10, 11 and it remains attached to principal reception element 10 by virtue of a hinge attachment system 34 (FIGS. 63 and 69).

Using a system of gliders, the four supplemental reception elements 29 are deployed using mechanical deployment systems 25 incorporated on the two principal reception elements 10, 11 in order to obtain a larger landing surface 12 (FIG. 64 through 66).

Figure 70:
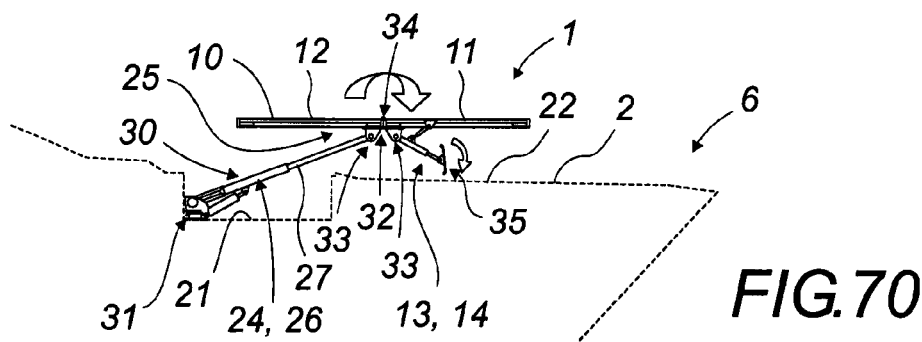
Figure 71:
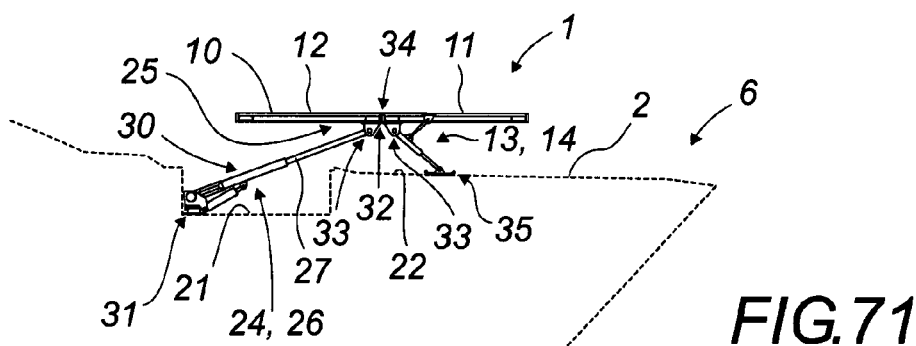

Before, during, or after landing area 1 is completely deployed, landing surface 12 is stabilized using adjustable supporting armatures 13 incorporated inside it, which are deployed and which contact support surface 22 (FIGS. 67 and 70). These supporting armatures 13 adapt to support surface 22 using "buffer" elements 35 made of material designed to rest on the deck of a ship 6 without harming the surface 22 and which ensures that landing area 1 is positioned on it so as to be stable and shock proof. These supporting armatures 13 may advantageously integrate a perfected stabilization system as mentioned above.

This results in a landing area 12 that is larger, that can be oriented, and that also is perfectly stable and ideally suited for landing aerodynes 15 and aerostats (FIGS. 65 through 71).

The multifunctionality, adaptability, and safety of landing area 1 are attributable to a large number of the systems described above.

Figure 72:
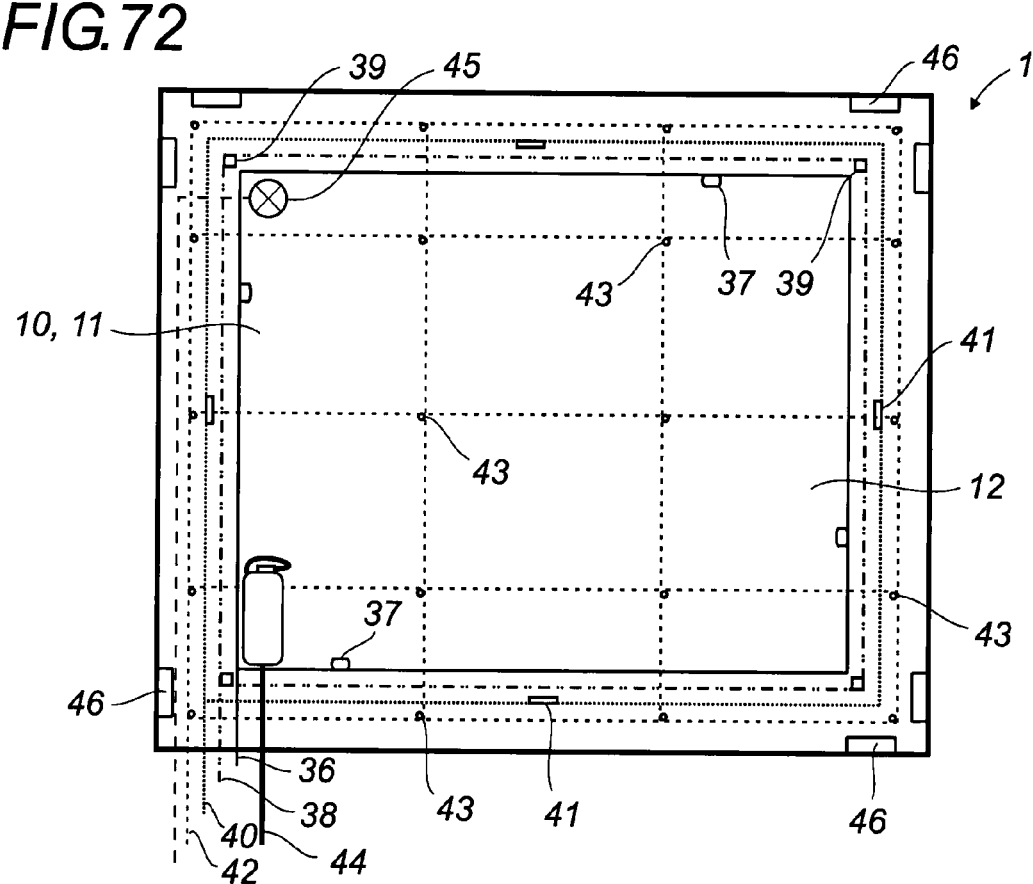
FIG. 72 is an overhead view showing one example of the landing area of the invention in the deployed position and comprising several networks.

One example of a landing surface 12 according to a preferred embodiment that integrates a large number of these systems is shown from above in FIG. 72. For the sake of convenience, in this drawing the demarcations between the various reception elements 10, 11 are not shown. Therefore, landing surface 12 as shown may consist of any number of reception elements 10, 11, 29. This landing surface 12 advantageously comprises the following means:

A liquid distribution network 36 for pressurized or unpressurized liquid 36 supplying various liquid intake devices 37 distributed over landing surface 12;

An air distribution network 38 for pressurized or unpressurized air 38 supplying various air intake devices 39 distributed over landing surface 12;

A power distribution network 40 supplying electricity to various electrical intake devices 41 distributed over landing surface 12;

A fire prevention network 42 supplying various fire prevention nozzles 43 covering landing surface 12;

A fuel supply network 44, for aviation fuel, kerosene, diesel oil, or the like; and A navigation beacon 45 equipped with visual, auditory, or radio warnings or similar devices.

FIG. 72 shows a non-exhaustive depiction of some attachment points 46 for stowing, adding, and/or connecting any system, for example for the following purposes:

To complete and/or develop the surface of the landing area by adding landing surfaces 12 or by juxtaposing two landing areas 1;

To attach or stow, either permanently or not, any objects or materials in order to transport, secure, and/or use or store them;

To connect and/or attach any material or object that needs to be supplied by landing area 1 and/or attached either permanently or not to the landing area.

For purposes of clarity in the drawing, the strip of lights 16 outlining landing area 1 and the lighted letter "H" 17 located in its center are not shown, although advantageously they are present.

As mentioned previously, landing area 1 of the invention preferably is adaptable thanks to a system for fitting up landing area 1. Thus, landing surface 12 may also comprise the following elements, even though they have not been shown:

Perforations to form housings, for example, to install posts in order to raise a roof over the area, or some other means of reconfiguring and fitting up landing surface 12 to add another function;

Attachment elements to form a stowage device for storing cargo, for example;

Means of connection to various multimedia networks, such as the internet, television, audiovisual and audio communication networks and so forth, in order to utilize landing surface 12 as a living space, or as an area for pleasure, information, work and/or for communication; and Any other means the user wishes to incorporate on landing surface 12.

Figure 73:
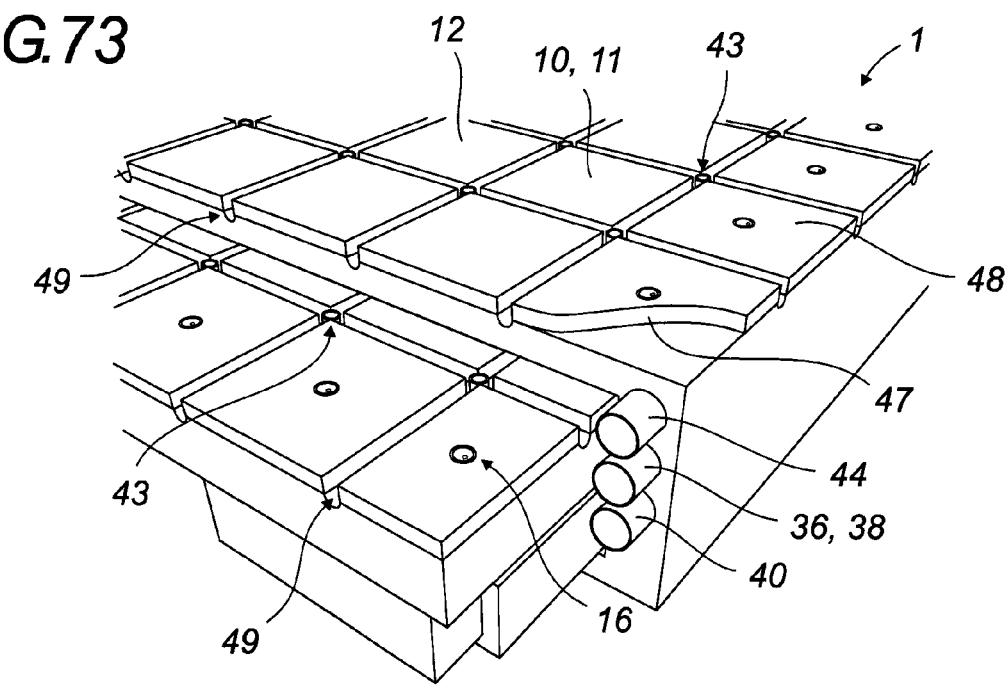
FIG. 73 is a cross-section in perspective showing one example of a landing area of the invention in partially deployed position and comprising several networks.

Another example of landing surface 12 according to a preferred embodiment of the invention is also shown in perspective in FIG. 73. This embodiment integrates the following systems and features:

Beacons 16 for defining the area, navigation, and signaling;

A fire prevention system 42 covering the entire landing surface 12 and incorporating a sprinkler system 43 to spray fire-extinguishing chemicals;

An electrical network 40 incorporating surface plugs to supply any electrical device;

A pressurized air system 38 and a pressurized water system 36, comprising connector nozzles 37, 39;

A pressurized fuel inlet 44 comprising one or more connector nozzles;

A modular, interchangeable, antistatic technical floor with a de-icing system;

An anti-slip coating 48;

A liquid evacuation system 49 comprising channels and gutters;

A specific connector 50 for connecting other landing area or landing surfaces in order to join them mechanically and fulfill the various functions listed above;

Stowage housings for storage; and

A lighted letter "H" 17 signaling the location of landing area 12 to aerodynes 15 and aerostats.

The threefold advantage of landing area 1 of the invention is that it does not consume much space, it can be incorporated into preexisting or non preexisting elements, and it supplies a large horizontal surface in areas where previously, it would have been impossible to so do.

This invention, therefore, is easily manufactured, whether by mass producing standard landing area models in accordance with the invention or upscale custom made models. Thus, in certain sectors it is possible to produce a small series as described in the example with the ship shown in FIGS. 63-71. There are currently many shipbuilders, and the dimensions of many sunbathing structures are often similar to this size since they are designed to accommodate a person. For specialized operations, where each situation encountered is often unique, landing area 1 may be custom designed.

It is apparent that the invention is not limited to the preferred embodiments described above or to the variations shown in the different drawings, since a person skilled in the art may construe numerous modifications and conceive of other variations without departing from either the realm or the scope of the invention.

The invention claimed is:

1. A deployable landing area (1) for either an air machine or one of a vertical landing or a short takeoff/landing device, the landing area (1) being attached to a support surface (22) of a support (2), which is otherwise unsuited for landing of either the air machine or one of the vertical landing or the short takeoff/landing device thereon, for forming a temporary flat deployable landing area (1) on the support surface, wherein the landing area (1) comprises:

at least two reception elements (10, 11) which are interconnected with one another and, when deployed, form a larger deployed landing surface (12) which is spaced from the support surface (22) that is otherwise unsuited for landing;

at least one protective means (20) inside of which each one of the at least two the reception elements (10, 11) of the landing area (1) are completely retractable and storable, in at least a partially overlapped manner, so as to facilitate storage of the at least two reception elements (10, 11) within the at least one protective means (20) within a storage area which is more compact than the deployed landing surface (12);

at least one technical mechanical retraction means (24) for at least one of the at least two reception elements, the retraction means facilitates moving and retraction of the at least one of the at least two reception elements (10, 11) from a deployed position to a stored position in which each of the at least two reception elements (10, 11) is completely stored inside the protective means (20) in at least a partially overlapped manner and completely sheltered from the environment; and at least one of a technical mechanical extraction means (26) and a deployment means (25) for at least one of the at least two reception elements (10, 11), the extraction means (26) moving and deploying at least one of the at least two reception means (10, 11) from the stored position, in the protective means (20), to the deployed position spaced from the support surface (22) which facilitates direct landing of one of the air machine the vertical landing and a short takeoff/landing device on deployed landing surface (12).

2. The landing area (1) according to claim 1, wherein the landing area further comprises at least one attachment and support armature (13) supporting the at least two reception elements (10, 11), once the at least two reception elements (10, 11) are deployed, such that the landing surface (12) is substantially horizontal.

3. The landing area (1) according to claim 1, wherein the landing area is removably attached to the supporting surface (22) of a support (2) by an automatic connecting system using at least one of a plug, a connection and a quick connector (31).

4. The landing area (1) according to claim 1, wherein the supporting surface (22) of the support (2) is attached to one of a building (3), an offshore oil drilling platform (4), mountainous terrain (5), a ship (6), a tree (7), a vehicle (8), a structure (9) floating on water and any other type of vehicle, terrain or natural or artificial structure.

5. The landing area (1) according to claim 1, wherein the landing area (1) either projects from the supporting surface (22) of a support (2) or is embedded within the supporting surface (22) at least one of horizontally, laterally, or suspended.

6. The landing area (1) according to claim 1, wherein the protective means (20) is one of an embedded housing, a hood and a protective cover.

7. The landing area (1) according to claim 1, wherein at least one of the technical mechanical extraction means (26), the deployment means (25), and the retraction means (24) is operated one of electrical, magnetic, aerolic, pneumatic, hydraulic, hydropneumatic, motorized, or manual.

8. The landing area (1) according to claim 7, wherein at least one of the technical mechanical extraction means (26), the deployment means (25), and the retraction means (24) comprises hydraulic lift masts (30) that are one of horizontally and vertically guided by hydraulic cylinders (27).

9. The landing area (1) according to claim 1, wherein at least one of the technical mechanical extraction means (26), the deployment means (25), and the retraction means (24) comprises at least one of a mechanical arm, a lift mast (30), a scissored lifting device (28), a cylinder (27), a pump, a rack, a chain and a cable.

10. The landing area (1) according to claim 1, wherein movement produced by the technical mechanical retraction means (24) comprises at least one of a centered pivoting movement, an offset pivoting movement and a translational movement.

11. The landing area (1) according to claim 1, wherein at least one of the technical mechanical extraction means (26), the deployment means (25), and the retraction means (24) comprises at least one guide device comprising one of a glider, a rail, an overhang, a trestle, a contact, a stand, a suspended device and a tilting device.

12. The landing area (1) according to claim 1, wherein the technical mechanical deployment means (25) moves the at least one reception element (10, 11) to deploy the at least one reception element (10, 11) in a form of a diaphragm, a corolla, a fan, an umbrella, a platform, a shutter, flaps, rolling shutters, or to open the at least one reception element (10, 11) into at least two flap segments.

13. The landing area (1) according to claim 1, wherein the landing area (1) further comprises a means (32) for pivoting the landing surface (12).

14. The landing area (1) according to claim 1, wherein the landing area (1) further comprises a shock absorbing system and a motion compensation system for the surface (22) of the support (2) to which the landing area (1) is attached.

15. The landing area (1) according to claim 14, wherein the motion compensation system for the surface (22) of the support (2) comprises at least one of regulated hydraulic cylinders, for eliminate one of pitching and rolling, shock absorbers and anti-vibratory systems.

16. The landing area (1) according to claim 1, wherein the landing area (1) further comprises a system for controlling at least one of deployment, halting deployment and maintaining landing area (1) in a desired position.

17. The landing area (1) according to claim 1, wherein the landing area (1) further comprises a system for joining two successive reception elements (10, 11) with one another and forming the larger deployed landing surface (12).

18. The landing area (1) according to claim 1, wherein the landing area (1) further comprises at least one of the following elements:
- a network for distribution of pressurized or non-pressurized liquid (36) supplying various liquid nozzles (37) distributed over the landing surface (12);
- a network for distribution of pressurized or non-pressurized air (38) supplying various air outlets (30) distributed over the landing surface (12);
- an electrical distribution network (40) supplying various electrical outlets (41) distributed over the landing surface (12);
- a fire prevention network (42) supplying various fire prevention nozzles (43) covering the landing surface (12);
- a fuel distribution network (44);
- a navigation beacon (45) equipped with one of a visual, an auditory, and a radio signals;
- attachment points (41) for one of fastening, adding, and connecting any system allowing:
  - the landing surface to be at least one of completed and developed by adding landing surfaces (12) or by juxtaposing two landing areas (12);
  - the attachment or fastening, either permanently or not, any object or material in order to transport, secure or utilize or store the object or the material;
  - the connection or attachment of any material or object that must be supplied by the landing area(1) or fixed to the landing area(1);
- a de-icing system;
- a temperature raising system;
- an energy generating system;
- an energy storage system;
- a cold air temperature control system;
- a hot air temperature control system; and
- a manipulating arm or other lifting system for manipulating objects of high mass.

19. The landing area (1) according to claim 1, wherein the landing surface (12) comprises at least one of the following elements:
- perforations forming housings or some other means of reconfiguring and arranging the landing surface (12) to give it another function;
- attachments forming a connecting device;
- a means of connection to various multimedia networks;
- beacons for demarcation, navigation, and signaling;
- a fire-prevention system (42) covering the entire landing surface (12) and incorporating a system of nozzles (43) projecting fire extinguishing substances;
- an electrical network (40) incorporating surface outlets (41) to supply any electrical apparatus;
- a system for pressurized air (38) and water (36) comprising connecting nozzles (37, 39);
- a pressurized fuel inlet (44) comprising one or more connecting nozzles;
- a technical, interchangeable, antistatic modular floor (47) that is and comprises an anti-ice system;
- an anti-skid coating (48);
- a liquid evacuation system (49) comprising channels and gutters;
- a specific connector (50) for connecting other landing surfaces (12) or landing areas (1) in order to join them mechanically and fulfill the different functions previously cited;
- connecting housings for storage; and
- a lighted letter "H" (17) signaling the location of the landing surface (12) to aerodynes (15) and aerostats.

20. A deployable landing area (1) for forming a temporary deployable landing surface (12) spaced from but supported on a support surface and facilitate landing of an aircraft thereof, the landing area (1) being supported by the support surface (22) of a support (2) which is otherwise unsuited for landing of the aircraft,
wherein the landing area (1) comprises:
- a plurality of reception elements (10, 11) which are interconnected with one another and, when deployed, form the deployed landing surface (12) which is supported on the support surface (22);
- at least one protective mechanism (20) being supported by the support, and the plurality of reception elements (10, 11) all being retractable and accommodated inside the at least one protective mechanism (20) so as to be completely sheltered from the environment by the at least one protective mechanism (20), and the plurality of reception elements (10, 11) at least partially overlap one another, when retracted inside the at least one protective mechanism (20), so as to facilitate storage of the plurality of reception elements (10, 11) within the at least one protective means (20) in a storage area which is smaller than the deployed landing surface (12);
- at least one mechanical retraction mechanism (24) for the plurality of reception elements, the retraction mechanism facilitates movement and retraction of the plurality of reception elements (10, 11) from the deployed position to the stored position in which each of the plurality of reception elements (10, 11) is completely stored inside the protective mechanism (20) in the at least partially overlapped manner; and at least one deployment mechanism (25) for deploying the plurality of reception elements (10, 11) from the stored position into the deployed position in which the landing area (1) is supported on the support surface, the deployment mechanism (26) moves and deploys the plurality of reception means (10, 11) from their stored position, inside the at least one protective mechanism (20), to the deployed position in which the landing surface (12) is spaced from but supported on the support surface, and the deployed landing area (1) facilitates landing of the aircraft thereon.

* * * * *